Dec. 11, 1956  E. GEDDE  2,773,465
CAN BODY MAKING MACHINE WITH ROTATABLE
SEAM ASSEMBLING MECHANISM
Filed Oct. 1, 1953  8 Sheets-Sheet 1

INVENTOR.
ERIK GEDDE
BY
ATTORNEYS

Dec. 11, 1956

E. GEDDE

2,773,465

CAN BODY MAKING MACHINE WITH ROTATABLE
SEAM ASSEMBLING MECHANISM

Filed Oct. 1, 1953

INVENTOR.
ERIK GEDDE

BY Charles H. Erne
Leland R. McCann
George W. Reiber
ATTORNEYS

Dec. 11, 1956

E. GEDDE

2,773,465

CAN BODY MAKING MACHINE WITH ROTATABLE
SEAM ASSEMBLING MECHANISM

Filed Oct. 1, 1953

INVENTOR.
ERIK GEDDE
BY
ATTORNEYS

United States Patent Office 2,773,465
Patented Dec. 11, 1956

2,773,465

CAN BODY MAKING MACHINE WITH ROTATABLE SEAM ASSEMBLING MECHANISM

Erik Gedde, Park Ridge, Ill., assignor to American Can Company, New York, N. Y., a corporation of New Jersey Application October 1, 1953, Serial No. 383,548

10 Claims. (Cl. 113—8)

The present invention relates to a can body making machine and more particularly relates to a novel and effective means for interengaging and interlocking the side seam hooks of a partially formed can body during the forming of the body side seam.

In its novel and inventive feature, the present invention is an improvement over the can body making machine disclosed in United States Patent 1,770,041 issued July 8, 1930, to J. F. Peters on Roll Bodymaker.

An object of this invention is the provision in a can body making machine of an improved side seam assembling device which is relatively simple in construction, gentle in operation and which eliminates several ponderous moving parts heretofore thought necessary, while greatly improving the efficiency of the machine so that can bodies may be produced at an increased rate of speed and without distortion.

Another object of the invention is the provision of such a side seam assembling device which reduces the cost of machine production and also reduces the maintenance of machine operation.

Numerous other objects and advantages of the invention will be apparent as it is better understood from the following description, which, taken in connection with the accompanying drawings, discloses a preferred embodiment thereof.

Referring to the drawings.

As a preferred or exemplary embodiment of the instant invention the drawings disclose the principal parts of a can body making machine of the type disclosed in the above mentioned Peters Patent 1,770,041 and including a side seam assembly and bumping station of novel construction. In such a machine a partially formed tubular sheet metal can body A (Figs. 1 through 15) having an outwardly bent inner side seam hook B and an inwardly bent outer side seam hook C is advanced along a support or mandrel 21 in a step-by-step or intermittent manner through a plurality of stations at which various operations are performed on the body.

Figure 12:
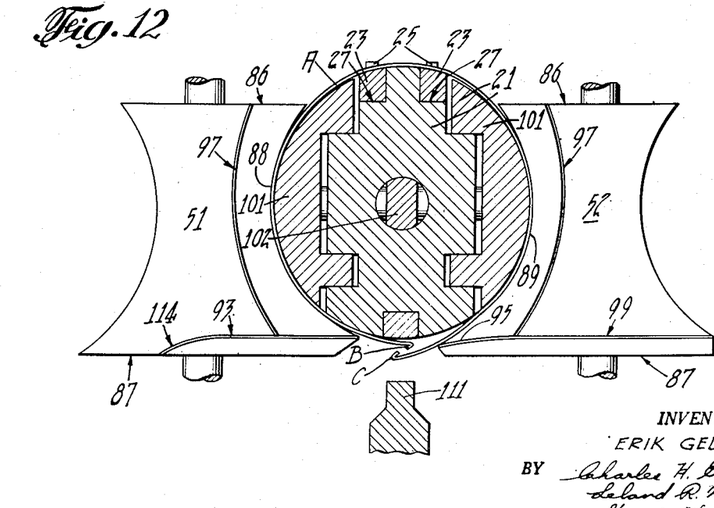

While on the mandrel 21 the partially formed can body A is advanced into a side seam assembling and bumping station D (Fig. 1) for the formation of a side seam E (Fig. 15) which unites the hooked edges of the body. At this station opposed freely movable side wall portions of the can body are first pressed inwardly against the mandrel 21 to arrange the yet free side seam hooks B, C in overlapping relation (Fig. 12). The side wall portions of the can body are then slightly expanded to interengage the hooks B, C, and finally the interengaged hooks are pressed or bumped together tightly into interlocked relation to produce the side seam E.

The advancement of the can body A along the mandrel 21 to and through the assembling station D is effected by a pair of spaced and parallel feed bars 23 (Figs. 1 and 3) having longitudinally spaced spring held feed dogs 25. The feed bars operate in longitudinal grooves 27 formed in the mandrel 21. Reciprocating movement is imparted to the feed bars 23 by a rocker arm 28 mounted on a pivot shaft 29 carried in suitable bearings formed in a frame 31 which constitutes the main frame of the body maker. The upper end of the rocker arm 28 is connected by a link 32 to a depending lug 33 secured to the feed bars 23. Intermediate its ends, the rocker arm 28 is connected to one end of a crank arm 34. The crank arm 34 at its opposite end surrounds a crank 35 of a crank shaft 36 journaled in the machine frame 31. The crank shaft 36 is rotated by an endless chain 37 which operates over a sprocket 38 on the crank shaft and over a sprocket 39 keyed to an intermediate shaft 41 journaled in suitable bearings formed in the machine frame 31.

The intermediate shaft 41 is rotated continuously by an endless chain 42 which operates over a sprocket 43 (Fig. 1) on the intermediate shaft 41 and over a driving sprocket 44 (see also Fig. 2) keyed to a drive shaft 45 which constitutes the main drive shaft for the entire machine. The main drive shaft 45 is journaled in spaced bearings 46 formed in upright frame members 47, 48 of the machine frame 31. This shaft 45 is driven in any suitable manner such as shown in the above mentioned Peters patent.

Figure 1:
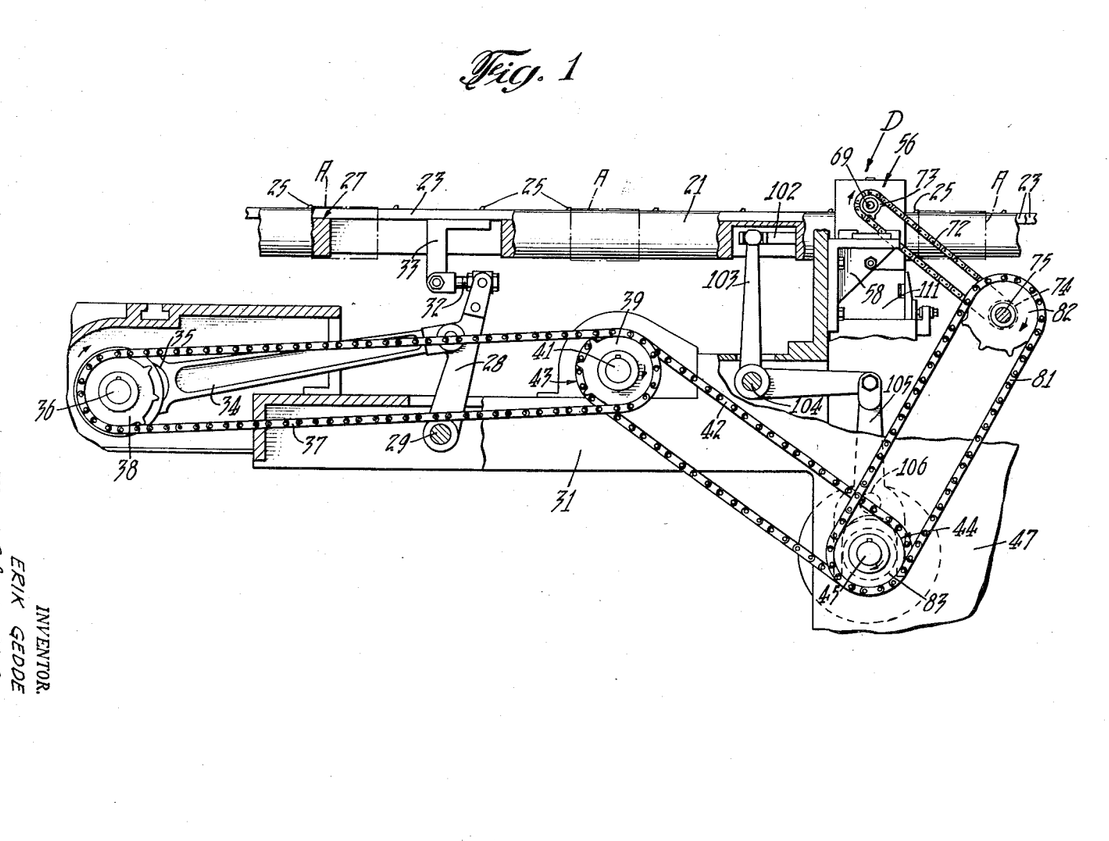
Figure 1 is a side elevation of a portion of a can body making machine embodying the instant invention and its interrelation with other members of the machine, parts being broken away and parts shown in section.
Figure 2:
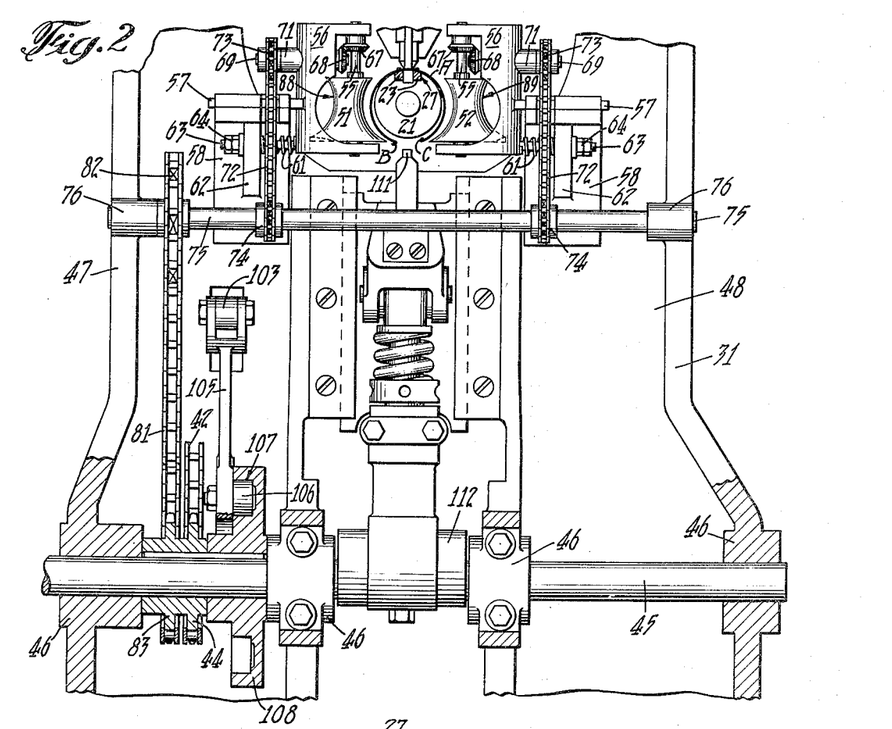
Fig. 2 is an enlarged partial and elevation of the exit end of the machine as viewed from the right in Fig. 1, with some of the parts shown in section.
Figure 3:
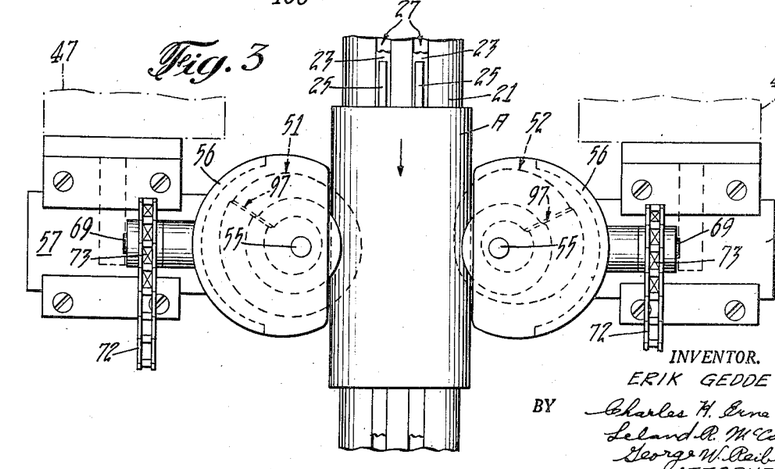
Fig. 3 is an enlarged schematic plan view of the side-seam-hook interlocking and bumping station shown in the upper portion of Fig. 2 and embodying the novel hook engaging means of the present invention.

Thus, through rotation of the main shaft 45, the feed bars 23 are reciprocated through a feeding stroke, toward the right as viewed in Fig. 1 and thence through a return stroke, toward the left in the same figure, in time with the other moving parts of the machine. During each feeding stroke, the feed bars 23 advance a plurality of can bodies A along the mandrel 21 in processional order and advance the leading can body of the procession into the assembly and bumping station D for the interengagement of its side seam hooks B, C and their compression into a side seam E as hereinbefore mentioned.

Interengagement of the can body side seam hooks B, C preferably is started while a can body A is entering the station D and is completed while the body is at rest at the station, merely to increase production, although the entire operation may be effected while the body is at rest, if desired. This interengagement of the side seam hooks B, C is effected by a pair of eccentrically mounted and vertically disposed, rotatable spools or rollers 51, 52 (Figs. 2 and 3) constituting molds located at the station D, one on each side of the mandrel 21 on which the can body A is supported.

The hook engaging rollers 51, 52 are eccentrically mounted on a pair of vertical shafts 55 disposed one on each side of the mandrel 21 and journaled at their ends in bearings formed in U-shaped cages or brackets 56. Each cage is yieldably mounted in the machine frame for slight movement away from the mandrel during the hook engaging operation as will be more fully explained hereinafter. For this purpose, each cage 56 is formed with a horizontally projecting slide 57 which is supported in and operates in a slideway formed in a support bracket 58 secured to the upright members 47, 48 of the machine frame 31. There are two brackets 58, one for each cage 56. Yieldable pressure is exerted against the cages 56 in a direction toward the mandrel 21, by compression springs 61 which are disposed between each cage 56 and an adjacent web 62 on each bracket 58. The springs surround bolts 63 which are threaded into the cages 56 and extend through clearance holes in the bracket web 62. Locknuts 64 on the outer ends of the bolts limit the inward travel of the cages under pressure of the springs.

The body and body hook engaging rollers 51, 52 preferably are rotated and continuously and eccentrically, in unison on axes disposed at substantially right angles relative to the path of the bodies and with the body engaging surfaces of the rollers moving in opposite directions and opposite to the direction of travel of the can bodies A along the mandrel 21. For this purpose each of the roller shafts 55 carries a bevel gear 67. The two bevel gears 67 mesh with two driving gears 68 mounted independently on two horizontally disposed shafts 69 respectively journaled in bearings 71 formed in the casings 56. The two shafts 69 are rotated simultaneously and at the same speed by a pair of endless chains 72 which operate over sprockets 73 carried on the outer ends of the shafts 69 and over sprockets 74 mounted on a driven cross shaft 75 journaled in bearings 76 formed in the upright frame members 47, 48.

The driven cross shaft 75 is rotated continuously by an endless chain 81 which operates over a sprocket 82 on the cross shaft 75 and over a driving sprocket 83 on the main drive shaft 45. Through this connection with the main drive shaft 45, the hook engaging rollers 51, 52 are rotated in synchronism with the other moving parts of the machine. The timing preferably is such that the rollers 51, 52 make one revolution for each full cycle of operation (feeding and return stroke) of the feed bars 23.

The hook engaging rollers or spools 51, 52 preferably are formed with flat top and bottom ends 86, 87 (Fig. 10) and between these ends with concave vertical faces 88, 89 respectively, the concave faces having a curvature substantially equal in general to the outside contour of the mandrel 21. The lower ends 87 of the rollers are considerably larger in diameter than the upper ends 86 so as to travel well under the mandrel 21 during a portion of the cycle of rotation of the rollers to interengage the hooks B, C of the can body as will be explained hereinafter.

Figure 4:
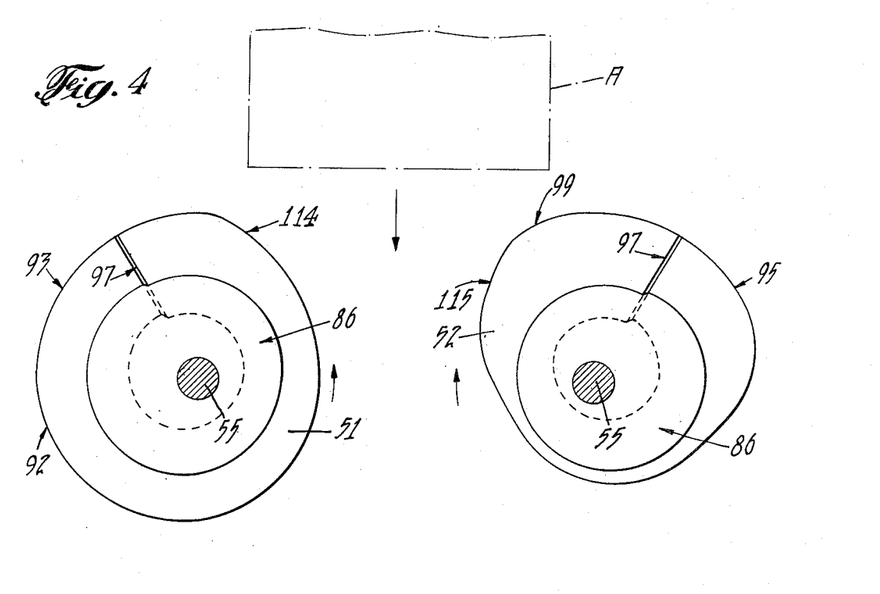
Figs. 4 through 9 are enlarged schematic plan views of the novel hook engaging means showing different stages in the sequence of their operation.
Figure 10:
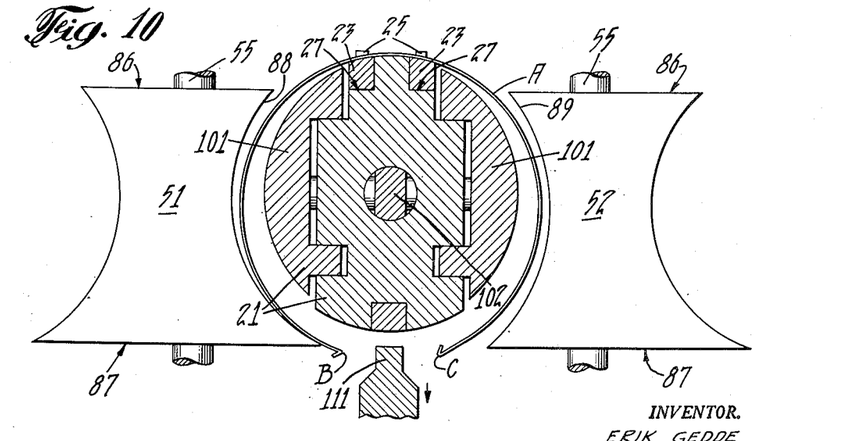
Figs. 10 through 15 are side elevations of the novel hook engaging means corresponding respectively to the views shown in Figs. 4 through 9.

Due to the eccentric mounting of the rollers 51, 52 on their vertical shafts 55, the concave faces 88, 89 of the rollers at the beginning of a cycle of operation, are spaced away from the mandrel 21, as best shown in Figs. 4 and 10 to provide clearance spaces between the mandrel and the rollers for the unobstructed entrance of the still expanded unseamed can body A into the assembly station D. At this station D the mandrel 21 is reduced in size to a diameter slightly smaller than the full diameter of a finished can body to permit proper interengagement of the body hooks B, C. Hence when the can body, at the beginning of a cycle of operation, is fed into the assembly station D, the sides of the body hang down loosely around and in spaced relation to the reduced diameter portion of the mandrel 21 as best shown in Fig. 10.

Figure 5:
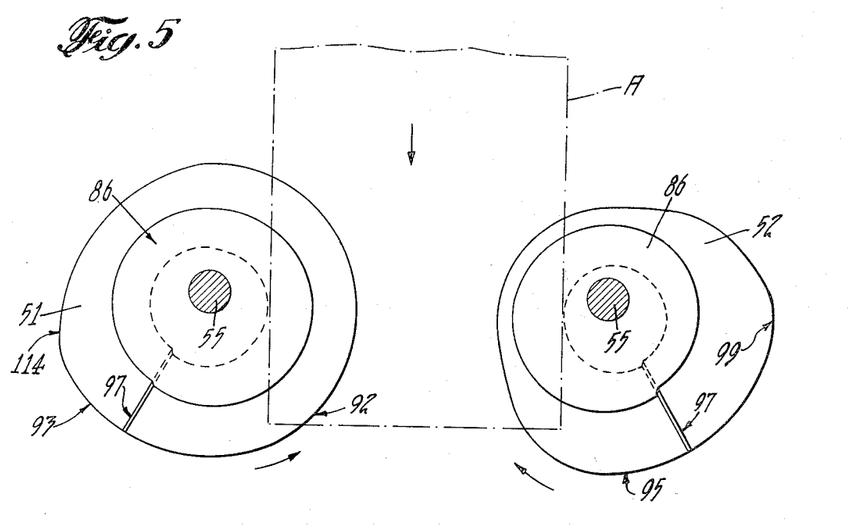
Figure 11:
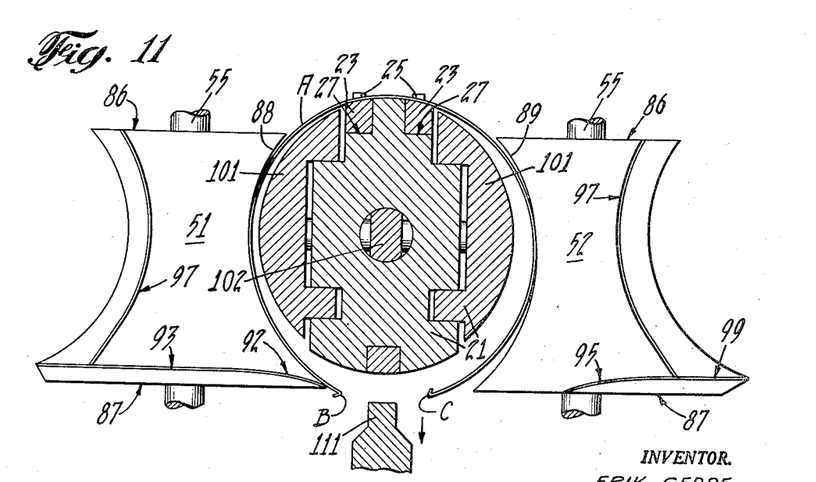

As the can body advances along the mandrel 21 and enters the assembly station D during the feeding stroke of the feed bars 23, at the beginning of the assembling cycle, as shown in Figs. 5 and 11, the body passes between the rollers 51, 52 and before the body comes to rest at the station, the rotating, eccentrically mounted rollers begin to close in against the loose depending sides of the body and thus support them temporarily. During this initial portion of the assembling cycle, the rollers 51, 52 have rotated from the position shown in Fig. 4 to that shown in Fig. 5, through an angle of approximately 120 degrees.

Figure 13:
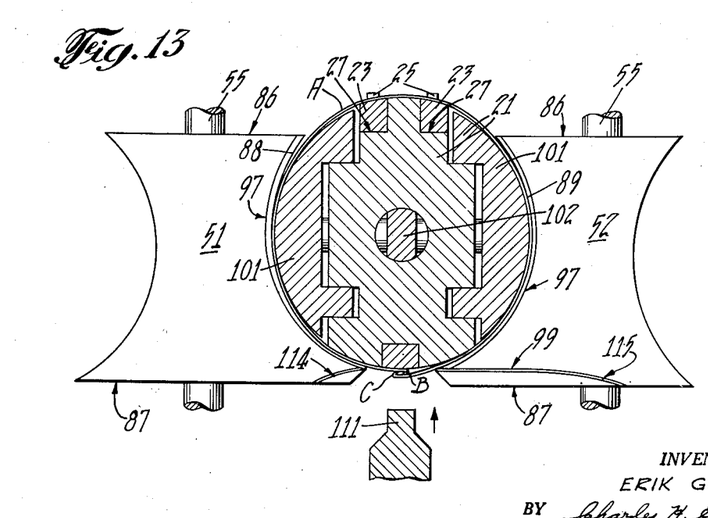

With both sides of the can body supported as mentioned above and preferably after the body comes to rest at the station D, the inside hook B is moved into position against the under side of the mandrel 21 as shown in Fig. 12 and this is immediately followed by a slightly retarded similar movement of the outside hook C to arrange the hooks in overlapping relation with the hook C on the outside and supporting the hook B as shown in Fig. 13. Simultaneously with this positioning of the hooks B, C, the side walls of the can body are pressed inwardly by the concave faces 88, 89 against the mandrel 21.

Figure 6:
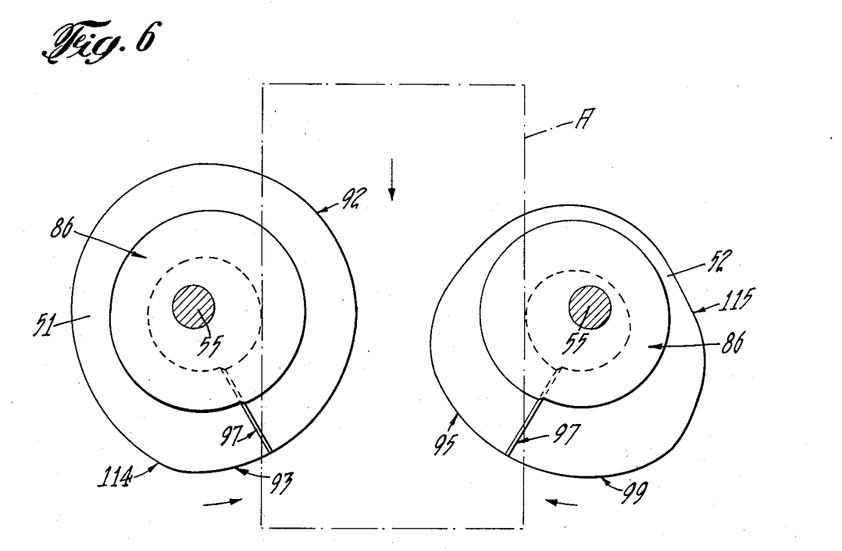

Pressing of the side walls of the can body against the mandrel 21 is brought about by the concave faces 88, 89 of the rollers 51, 52 as the rollers continue to rotate from the positions shown in Fig. 5 to the positions shown in Fig. 6 and by reason of the eccentric mounting of the rollers on their shafts 55 and the yieldable compression springs 61 in the cages 56. The lifting of the side seam hook B into position against the bottom of the mandrel 21 in advance of the hook C is effected by an inclined peripheral cam face or edge 92 (Fig. 11) formed in the concave face 88 of the roller 51 closely adjacent its bottom end 87. As the roller 51 continues to rotate, this inclined cam face 92 rides under the side wall of the can body adjacent the hook B and thus lifts the hook into position against the mandrel 21 as shown in Fig. 12. When the hook is in fully lifted position it is held against displacement by a horizontal cam face or edge 93 (Figs. 11, 12) which is a peripheral continuation of the inclined cam face 92. The lifted hook B is held against the mandrel until the opposite hok C is raised into position as mentioned above.

The raising of the opposite side hook C is effected by an inclined peripheral cam face or edge 95 (Figs. 11 and 12) formed in the concave face 89 of the roller 52 closely adjacent its bottom end 87. As this roller continues to rotate, while the opposite roller 51 is holding the hook B in lifted position, the cam face 95 rides under the side wall of the can body adjacent the hook C and thus lifts this hook into a position overlapping and supporting the hook B as shown in Fig. 13. The hooks B, C are now in lateral alignment but are yet unengaged. To effect this arrangement of the hooks B, C, the rollers 51, 52 have rotated from the positions shown in Fig. 6 to that shown in Fig. 7.

Figure 14:
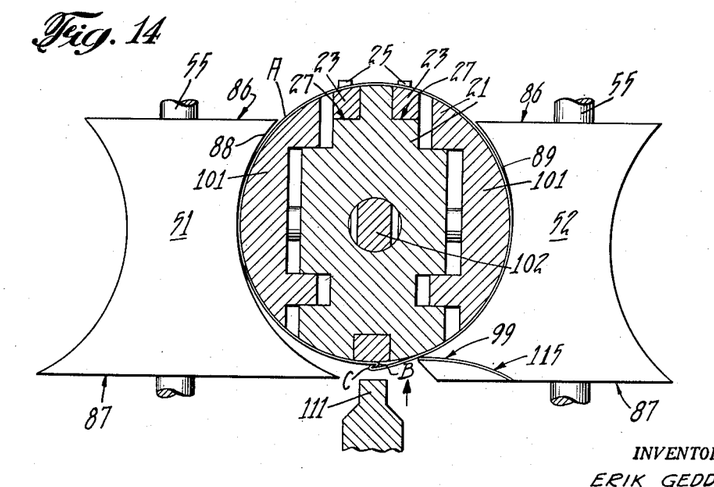

At this point in the assembly cycle, lateral pressure against the side walls of the can body by the concave faces 88, 89 of the rollers 51, 52 is slightly relieved, while the hooks B, C are held in their aligned positions against the bottom of the mandrel, and while the sides of the can body are expanded to fully finished diameter size of the can body. This expanding of the can body shifts the hooks B, C laterally in an outward direction and thus arranges them in interengaged position as shown in Fig. 14. This action is effected while the rollers 51, 52 rotate from the position shown in Fig. 7 to that shown in Fig. 8.

Figure 7:
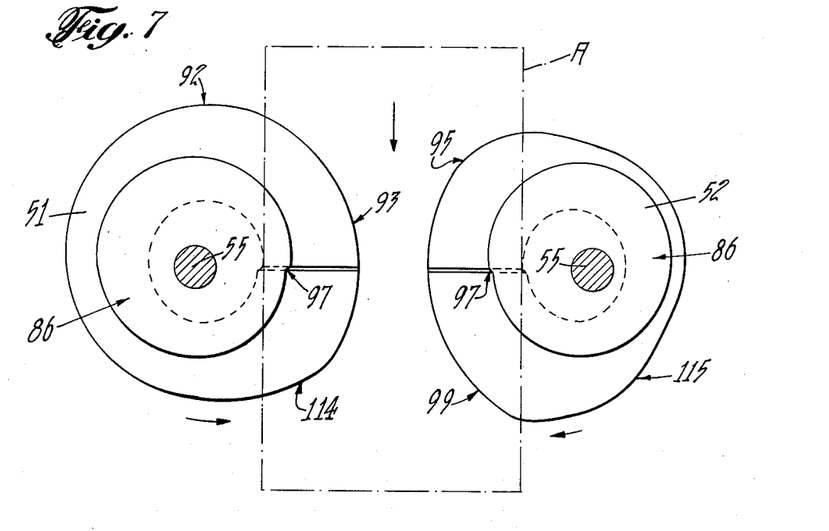

The relieving of the pressure of the concave faces 88, 89 of the rollers 51, 52 against the sides of the can body is effected by a sharp inwardly inclined step 97 (Figs. 6, 7, 12 and 13) formed in both concave faces 88, 89 of the rollers 51, 52. These steps 97 extend longitudinally of the rollers from their top ends 86 to the horizontal cam faces 93, 95 adjacent the bottoms 87 of the rollers. The two steps 97 in the two rollers 51, 52 are located in the rollers in such a manner as to rotate with the rollers into radial alignment simultaneously as shown in Fig. 7 and thus as the rollers continue to rotate, to pass out of radial alignment simultaneously and hence relieve the pressure on both sides of the can body equally and simultaneously.

During this relieving of the pressure on the sides of the can body, the side seam hook B is maintained in position against the bottom of the mandrel 21 by the horizontal cam face 93 on the roller 51. The opposite hook C is held in its overlapping position by a similar horizontal cam face or edge 99 (Figs. 12 and 13) which is formed in the concave face 89 of the opposite roller 52 and which is a continuation of the peripheral inclined cam face 95 in the same roller.

Expansion of the can body is effected by a conventional expanding device in the reduced diameter portion of the mandrel 21 as fully disclosed in the above mentioned Peters Patent 1,770,041. This device essentially comprises a pair of expansible checks 101 (Fig. 13) provided in the reduced diameter portion of the mandrel 21 and expanded and contracted in time with the other moving parts of the machine by a wedge bar 102 (Figs. 1 and 13) reciprocated by a bell crank 103 mounted on a pivot shaft 104 in the machine frame 31 and rocked by a cam yoke 105 actuated by a cam roller 106 (Fig. 2) operating in a cam groove 107 of a face cam 108 mounted on and rotated by the main driving shaft 45. The outward expansion of the cheeks 101 presses the sides of the can body against the relieved portion of the concave faces 88, 89 of the rollers 51, 52 which in turn yield under the compression springs 61 on the cages 56 to permit full expansion of the cheeks.

Figure 15:
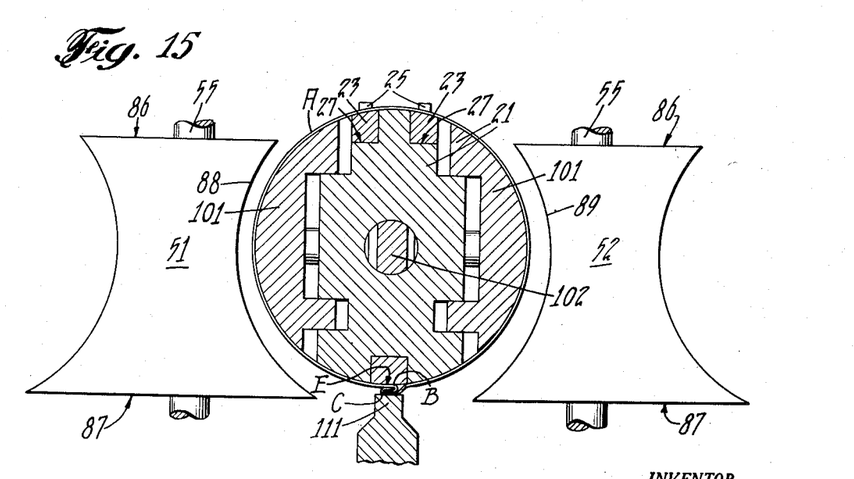

While the can body is held in its expanded position on the mandrel 21, the interengaged hooks B, C as shown in Fig. 14 are compressed against the bottom of the mandrel as shown in Fig. 15 to lock them together and thus produce the side seam E mentioned hereinbefore. This compression of the hooks B, C is effected by a conventional bumping hammer 111 (Figs. 1, 2 and 15) located under the mandrel 21 at the assembly station D and reciprocated toward and away from the mandrel in time with the other moving parts of the machine, by a crank 112 (Fig. 2) on the main driving shaft 45 as disclosed in the above mentioned Peters Patent 1,770,041.

Figure 8:
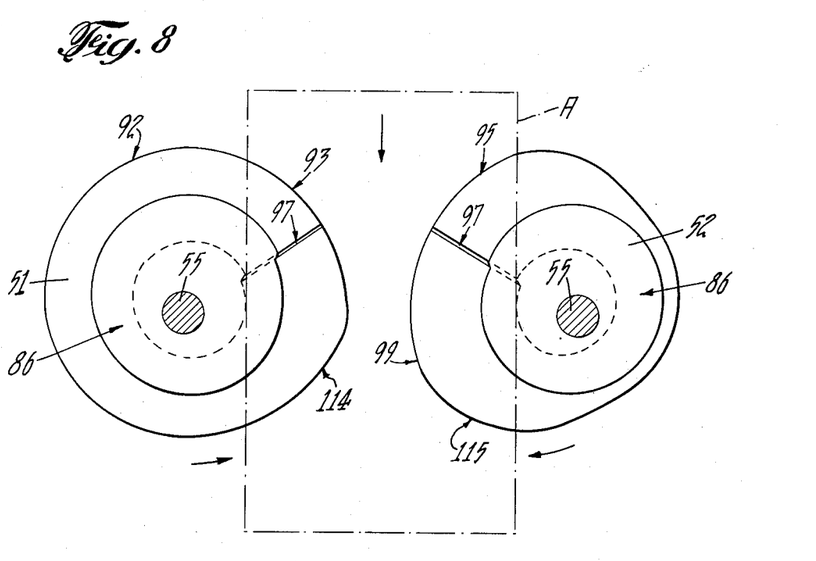
Figure 9:
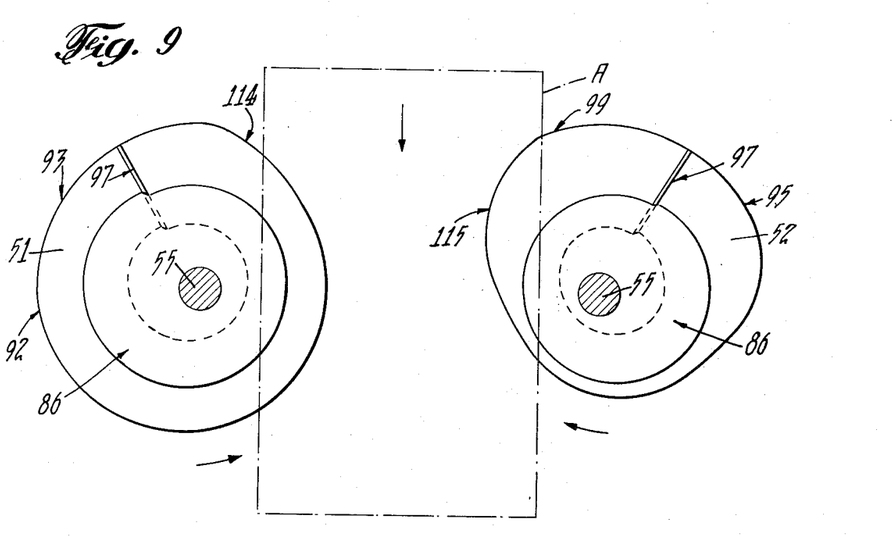

During this compression of the hooks B, C the rollers 51, 52 rotate from the position shown in Fig. 8 to that shown in Fig. 9. During this rotation the horizontal cam faces 93, 99 on the rollers support the hooks B, C until they are interlocked by the seam bumping operation. As soon as the bumping operation is completed, which is at the top of the up stroke of the hammer 11, the hammer begins to descend for a subsequent bumping operation on the next can body, and the support of the hooks B, C is removed by rotation of the horizontal cam faces 93, 99 from under the body. For this latter purpose, the cam faces 93, 99 merge into declining cam faces or edges 114, 115 (Figs. 13 and 14) formed on the rollers 51, 52 respectively as continuations of the horizontal cam faces 93, 99. Also during this rotation of the rollers 51, 52 their concave faces 88, 89 rotate away from the mandrel 21.

By the time the rollers 51, 52 reach the position shown in Fig. 9, the assembly cycle is completed, the side seam E is fully formed, the expanding cheeks 101 are returned to their normal collapsed position in the mandrel 21, the bumping hammer 111 is descending, the feed bars 23 have returned to their initial position, and the finished can body A is free on the mandrel 21, ready to be pushed out of the assembly station D by the feed bars 23 when they move forward through the next feeding stroke to advance the next can body in the procession on the mandrel, into the assembly station D for a hook assembling operation.

Thus in one complete revolution of the eccentrically mounted concave rollers 51, 52 the side seam hooks B, C are rapidly and smoothly interengaged and locked together to produce the side seam E while the can body A is being advanced into and out of the assembly station D.

It is thought that the invention and many of its attendant advantages will be understood from the foregoing description, and it will be apparent that various changes may be made in the form, construction and arrangement of the invention or sacrificing all of its material advantages, the form hereinbefore described being merely a preferred embodiment thereof.

I claim:

1. In a can body making machine and the like, the combination of a mandrel for supporting a partially formed can body, said can body having separated sides terminating in two reversely bent seam hooks initially separated from each other, means for advancing said can body along said mandrel, a roller mounted for eccentric rotation on an axis disposed on each of opposite sides of said mandrel, each of said rollers having spaced ends and arcuate, generally concave side surfaces therebetween, said side surfaces conforming substantially to the outside contour of said mandrel and adapted to directly engage and force said separated sides of said can body inwardly towards and into contact with said mandrel, a cam disposed at one end of each of said rollers comprising a first face extending around a portion of said roller and a second face extending around another portion of said roller joined at its extremities to said first face by sloping faces, said second face being substantially parallel with and spaced laterally from said first face, said cam on each roller being adapted to sequentially and directly engage said can body sides adjacent their side seam hooks to force first one of said hooks inwardly against said mandrel and sequentially to force the other of said hooks inwardly into juxtaposed position with said first named hook, and a step on each of said rollers having a high portion and a low portion extending along said roller side surfaces in the direction of the longitudinal axis of said rollers thereby sharply reducing the cross-sectional dimensions of said rollers from said high portion to said low portion and adapted to release the pressure against said can body sides to permit said sides to bulge outwardly to loosely interengage the juxtaposed side seam hooks.

2. In a can body making machine and the like, the combination of a can body mandrel for supporting a partially formed can body having an outwardly extending side seam hook and an inwardly extending side seam hook initially separated from one another, means for advancing said can body along said mandrel, eccentrically mounted rotatable means disposed adjacent opposite sides of said mandrel, said rotatable means having body engaging surfaces movable opposite to the direction of travel of the advancing can bodies for directly engaging the sides of said can body and forcing these sides inwardly towards and into contact with said mandrel, cam means on said rotatable means for sequentially directly contacting said can body sides adjacent their side seam hooks for pressing said hooks against said mandrel and into overlapping relation, means for actuating said rotatable means in time with said body advancing means, and means on said rotatable means to release the pressure against said can body sides whereby said sides bulge outwardly to interengage said overlapping side seam hooks.

3. In a can body making machine and the like, the combination of a can body mandrel for supporting a partially formed can body having an outwardly extending side seam hook and an inwardly extending side seam hook initially separated from one another, means for advancing said cam body along said mandrel, rotatable means disposed adjacent opposite sides of said mandrel and mounted for eccentric rotation on axes spaced from and crossing the axis of said mandrel for directly engaging the sides of said can body and forcing said sides inwardly towards said mandrel, cam means on said rotatable means for sequentially and directely engaging said can body sides adjacent their side seam hooks to force first one of said hooks inwardly toward said mandrel and then the other of said hooks inwardly into juxtaposed position relative to said first mentioned hook, and means on said rotatable means to release the pressure against said can body sides whereupon said sides bulge outwardly and said juxtaposed hooks are thereby loosely interengaged.

4. In a can body making machine and the like, the combination of a can body mandrel for supporting a partially formed can body having an outwardly extending side seam hook and an inwardly extending side seam hook initially separated from one another, means for advancing said can body along said mandrel, rotatable means disposed adjacent opposite sides of said mandrel and mounted for eccentric rotation on axes each spaced from and crossing the axis of said mandrel for directly engaging the sides of said can body and forcing said sides inwardly towards said mandrel, cam means on said rotatable means for sequentially and directly engaging said can body sides adjacent their side seam hooks to force first said outwardly extending hooks inwardly toward said mandrel and then said inwardly extending hook inwardly into juxtaposed relation with said outwardly extending hook, means on said rotatable means to release the pressure against said can body sides whereupon said sides bulge outwardly thereby loosely interengaging said juxtaposed side seam hooks, and means for compressing together said interengaged side seam hooks to lock them in a side seam.

5. In a can body making machine and the like, the combination of a can body mandrel for supporting a partially formed can body having an outwardly extending side seam hook and an inwardly extending side seam hook initially separated from one another, means for advancing said can body along said mandrel into and through a hook assembly station, rotatable means yieldably mounted for eccentric rotation on axes spaced from and crossing the axis of said mandrel and disposed adjacent each of opposite sides of said mandrel at said station for directly engaging the sides of said can body and forcing said sides inwardly towards and into contact with said mandrel, cam means on said rotatable means for sequentially and directly engaging said can body sides adjacent their side seam hooks for pressing said hooks towards said mandrel and into overlapping relation, means for actuating said rotatable means in time with said body advancing means, means on said rotatable means to release the pressure against said can body sides, expander means in said mandrel at said station to bulge said can body sides outwardly against said yieldably mounted rotatable means when said pressure is released to expand said can body to a predetermined diameter and to interengage said overlapping side seam hooks, and means adjacent said mandrel at said station for compressing said interengaged hooks together to produce a locked side seam for said can body.

6. In a can body making machine and the like, the combination of a can body mandrel for supporting a partially formed can body having an outwardly extending side seam hook and an inwardly extending side seam hook initially separated from one another, means for advancing said can body along said mandrel, a pair of eccentrically mounted rotatable rollers respectively disposed adjacent opposite sides of said mandrel for directly engaging the sides of said can body and forcing said sides inwardly toward said mandrel, cam means carried by said rollers for sequentially and directly engaging said can body sides adjacent their side seam hooks to force first one of said hooks inwardly toward said mandrel and sequentially to force the other of said hooks inwardly into juxtaposed position with respect to said first named hook, and means associated with at least one of said rollers to release the pressure against at least one of said can body sides to permit said side to bulge outwardly to loosely interengage the juxtaposed side seam hooks.

7. The combination of claim 6 wherein said rollers are mounted on yieldable supports to permit pressing of said can body sides firmly against said mandrel.

8. The combination set forth in claim 6 in which said rollers are formed with side faces which are generally concave in shape and conform substantially to the outside contour of said mandrel.

9. The combination set forth in claim 8 in which said cam means comprises a face cam formed in an end portion of the concave side face of each of said rotatable rollers for sequentially lifting said side seam hooks into engagement with said mandrel.

10. The combination set forth in claim 9 in which said means to release the pressure on the can body side comprises a step formed in and extending longitudinally along the concave side face of at least one of said rotatable rollers to substantially reduce the cross-sectional dimensions of said roller.

References Cited in the file of this patent

UNITED STATES PATENTS

| | | |
|---|---|---|
| 513,136 | Symonds | Feb. 20, 1894 |
| 757,238 | Slaysman | Apr. 12, 1904 |
| 893,102 | Rudolphi | July 14, 1908 |
| 1,086,700 | Clark | Feb. 10, 1914 |
| 1,184,947 | Gossett | May 30, 1916 |
| 1,945,594 | Chase | Feb. 6, 1934 |